US006229851B1

(12) United States Patent
Cotton

(10) Patent No.: US 6,229,851 B1
(45) Date of Patent: May 8, 2001

(54) METHOD AND APPARATUS FOR LOOPING OF COMPRESSED VIDEO BITSTREAMS

(75) Inventor: Andrew Cotton, London (GB)

(73) Assignee: Snell & Wilcox Limited, Middlesex (GB)

( * ) Notice: Subject to any disclaimer, the term of this patent is extended or adjusted under 35 U.S.C. 154(b) by 0 days.

(21) Appl. No.: 09/171,133

(22) PCT Filed: Apr. 2, 1997

(86) PCT No.: PCT/GB97/00942

§ 371 Date: Feb. 23, 1999

§ 102(e) Date: Feb. 23, 1999

(87) PCT Pub. No.: WO97/39587

PCT Pub. Date: Oct. 23, 1997

(30) Foreign Application Priority Data

Apr. 12, 1996 (GB) .................................. 9607667

(51) Int. Cl.[7] ........................................... H04N 7/12
(52) U.S. Cl. ........................................... 375/240.25
(58) Field of Search ......................... 375/240.02, 240.03, 375/240.25; 348/419.1; 386/33, 66, 109

(56) References Cited

U.S. PATENT DOCUMENTS 5,598,352 * 1/1997 Rosenau et al. ..................... 395/806
5,740,307 * 4/1998 Lane ........................................ 386/68
6,031,960 * 2/2000 Lane ........................................ 386/68

FOREIGN PATENT DOCUMENTS

| 0656729A2 | 6/1995 | (EP) | ................................ H04N/7/58 |
| 0742670A2 | 11/1996 | (EP) | ................................ H04N/7/12 |
| 2242097A | 9/1991 | (GB) | ................................ H04N/7/12 |

OTHER PUBLICATIONS

Lauderdale et al, "A new technique for transmission of pre-encoded MPEG VBR video using CBR service", IEEE International Conference on Technologies for Tomorrow's Applications, Jun. 1996.*

S. Merrill Weiss, Switching Facilities in MPEG–2: Necessary But Not Sufficient, *8012 SMPTE Journal*, vol. 104, No. 12, Dec. 1995.

* cited by examiner

*Primary Examiner*—Vu Le
(74) *Attorney, Agent, or Firm*—Venable; Robert Kinberg

(57) ABSTRACT

In order to loop MPEG2 bitstreams without violating buffer occupancy constraints of downstream decoders, the replay bit rate is modified so the time taken to replay the looped sequence is made equal to the decode time. Looping of a sequence of compressed video bitstream is used for the purpose of testing MPEG2 decoders.

7 Claims, 5 Drawing Sheets

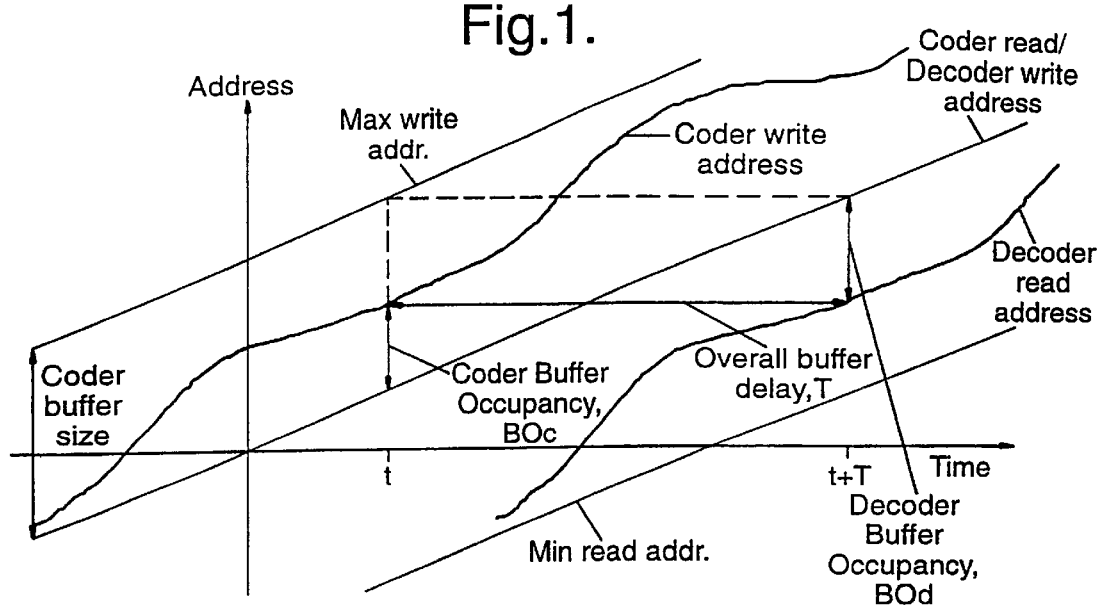
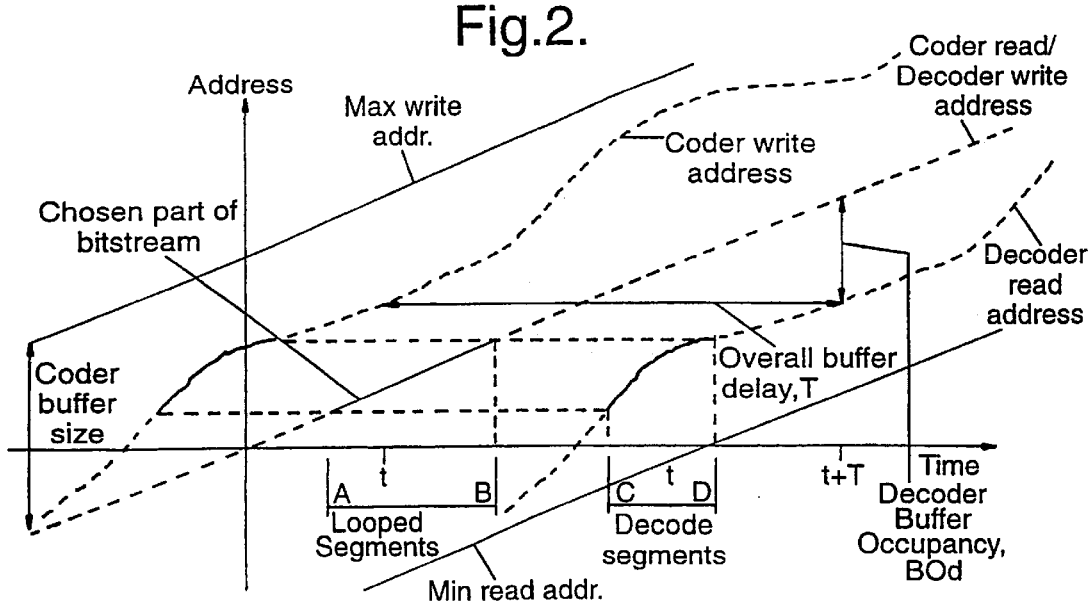

Fig.5.

| Input pics: | $I_0$ | $B_1$ | $B_2$ | $P_3$ | $B_4$ | $B_5$ | $P_6$ | $B_7$ | $B_8$ | $P_9$ | $B_{10}$ | $B_{11}$ | $I_{12}$ |
|---|---|---|---|---|---|---|---|---|---|---|---|---|---|
| Bitstream: | $I_0$ | $P_3$ | $B_1$ | $B_2$ | $P_6$ | $B_4$ | $B_5$ | $P_9$ | $B_7$ | $B_8$ | $I_{12}$ | $B_{10}$ | $B_{11}$ |
| Output pics: | $I_0$ | $B_1$ | $B_2$ | $P_3$ | $B_4$ | $B_5$ | $P_6$ | $B_7$ | $B_8$ | $P_9$ | $B_{10}$ | $B_{11}$ | |

Typical picture re-ordering for MPEG encoding

Fig.6.

| Bitstream: | $I_0$ | $P_3$ | $B_1$ | $B_2$ | $P_6$ | $B_4$ | $B_5$ | $P_9$ | $B_7$ | $B_8$ | $P_{12}$ | $B_{10}$ | $B_{11}$ |
|---|---|---|---|---|---|---|---|---|---|---|---|---|---|
| Output pics: | \|$I_0$ | $B_1$ | $B_2$ | $P_3$ | $B_4$ | | $P_6$ \| | $I_0$ | $B_1$ | $B_2$ | $P_3$ | $B_4$ | |

Incorrect selection of looped sequence end point.

Fig.7.

| Bitstream: | $I_0$ | $P_3$ | $B_1$ | $B_2$ | $P_6$ | $B_4$ | $B_5$ | $P_9$ | $B_7$ | $B_8$ | $P_{12}$ | $B_{10}$ | $B_{11}$ |
|---|---|---|---|---|---|---|---|---|---|---|---|---|---|
| Output pics: | \|$I_0$ | $B_1$ | $B_2$ | $P_3$ | $B_4$ | $B_5$ | $P_6$ \| | $I_0$ | $B_1$ | $B_2$ | $P_3$ | $B_4$ | |

Correct selection of sequence end point.

Fig.8.

| Input pics:  | $P_9$ | $B_{-2}$ | $B_{-1}$ | $I_0$ | $B_1$    | $B_2$    | $P_3$ | $B_4$ | $B_5$ | $P_6$ | $B_7$ | $B_8$ | $P_9$    | $B_{-2}$ | $B_{-1}$ | $I_0$ |
|---|---|---|---|---|---|---|---|---|---|---|---|---|---|---|---|---|
| Bitstream:   | $P_9$ | $B_7$    | $B_8$    | $I_0$ | $B_{-2}$ | $B_{-1}$ | $P_3$ | $B_1$ | $B_2$ | $P_6$ | $B_4$ | $B_5$ | $P_9$    | $B_7$    | $B_8$    | $I_0$ |
| Output pics: | $P_6$ | $B_7$    | $B_8$    | $P_9$ | $B_{-2}$ | $B_{-1}$ | $I_0$ | $B_1$ | $B_2$ | $P_3$ | $B_4$ | $B_5$ | $P_6$    | $B_7$    | $B_8$    | $P_9$ |

Picture re-ordering for a typical GOP

METHOD AND APPARATUS FOR LOOPING OF COMPRESSED VIDEO BITSTREAMS

This invention relates to the looping of compressed video bitstreams.

For many years video engineers have been accustomed to splicing the beginning and end of a sequence of images together to form a looping sequence. Often a few basic rules must be followed in order to ensure that the splice point is seamless. For instance a looped interlaced video clip should contain an even number of fields; if no tricks are applied to a PAL encoded sequence it should be a multiple of 8 fields in length in order to preserve the mathematical PAL sequence.

However, in the case of bit-rate reduced video, in particular MPEG encoding, there are many more constraints to consider. Indeed, some people have claimed that it is simply not possible in general terms to loop an MPEG video bitstream.

Techniques have already been developed that make it possible to loop specially prepared sequences. However, these techniques usually demand that the precise frames to be looped are known at the time of encoding.

It is here recognised that the problem of looping can be divided into two parts.

The first part is concerned with the selection of appropriate pictures to comprise the loop. The second part of the problem concerns the harder task of ensuring that a decoder's buffer does not over- or underflow whilst replaying a looped sequence. This can arise as a consequence of the variable length encoding process.

It is an object of this invention to provide a novel technique that allows a segment from any compressed sequence to be extracted and looped by a bitstream player, avoiding decoder buffer over-/underflow and requiring no knowledge of the looping at the encoding stage.

Accordingly, the present invention consists in a method of looping a sequence of compressed video bitstream having chosen start and end points, the sequence having a decode time determined by the number of frames in the sequence and the video frame rate, wherein the bit rate at which the sequence is replayed is modified such that the time taken to replay the sequence is made equal to the decode time for the sequence.

The present invention will now be described by way of example, with reference to the accompanying drawings, in which:

FIG. 1 is a diagram showing coder and decoder buffer occupancies for constant bit-rate coding.

FIG. 2 is a diagram illustrating the selection of a section of a bitstream for looping.

FIGS. 5, 6, 7 and 8 are tables illustrating the re-ordering of pictures in the compressed bitstream and the selection of a sequence end point for looping.

Figure 3:
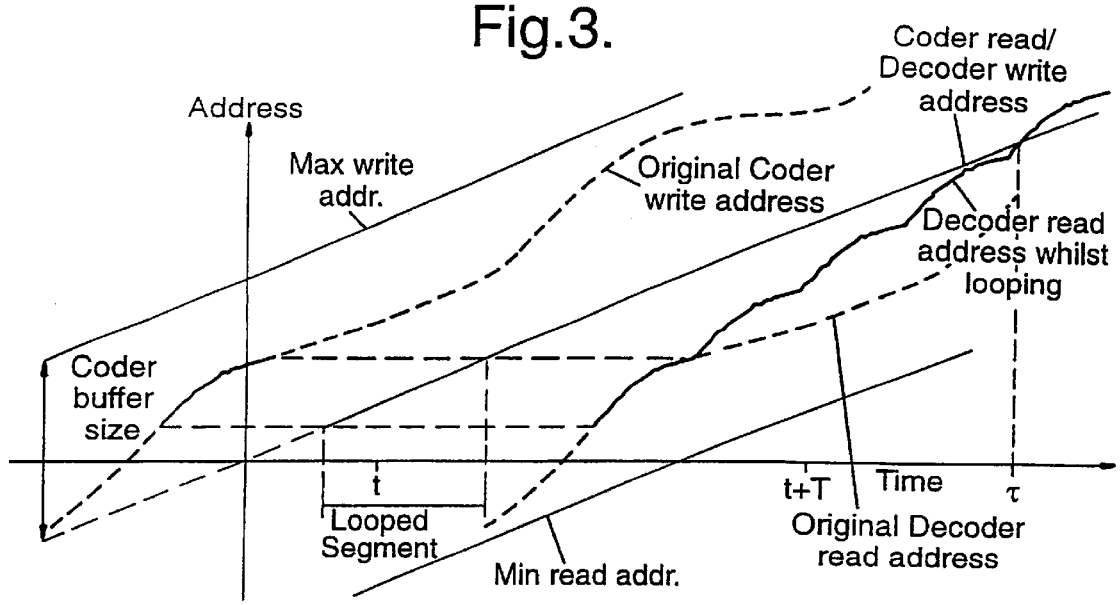
FIG. 3 is a diagram illustrating the problem of decoder buffer underflow.

In order to loop MPEG elementary streams four features of the compression algorithm need particular consideration:

Picture re-ordering for transmission,

Sequence and Group of Pictures (GOP) headers

Decoder buffer occupancy

Decoder buffer delay (VBV_delay)

These will be considered in turn, although the essential elements of the present invention lie in the solution to the problem of decoder buffer occupancy.

Looking first at picture re-ordering, it will be understood that both MPEG1 and MPEG2 video compression standards support three picture coding types: I, P and B. I pictures are intra-coded, i.e. they do not use information from other pictures in order to be reconstructed. P pictures are encoded using a motion compensated prediction based on a previous picture. B pictures are bi-directionally predicted using information from both a previous and a future I or P picture.

For a decoder to re-construct B pictures it must have access to both the previous and future I or P pictures. In order to simplify the decoding process these are both sent to the decoder prior to the B-picture, thus requiring some picture re-ordering at both the encoder and the decoder. This is shown in FIG. 5, where the subscripts indicate the temporal order of the pictures.

Because of the picture re-ordering, care must be taken when choosing the start and stop points to form a looped bitstream sequence. Clearly the first picture in the bitstream must be an I-picture as any other would rely on information carried in previous pictures which have been discarded. In MPEG, a series of pictures, typically starting with an I-picture, is referred to as a GOP (Group of Pictures). Thus, in bitstream order, pictures $I_0$ through to $B_8$ could form the first GOP of a sequence.

The last picture must be chosen in such a way that no missing pictures occur when re-ordered in the decoder for display. FIG. 6 demonstrates what happens if the wrong end point is chosen. The shaded pictures are those that have been selected from the bitstream for looping.

By making a poor choice of sequence end point, Picture $B_5$ is missing from the decoded looped sequence. In fact, the correct end point is always just before an I- or a P-picture, demonstrated in FIG. 7.

In FIG. 7 it can be seen that seven consecutive frames have been selected from the bitstream for looping and seven consecutive frames are also available after re-ordering for display.

For the sequence of frames shown above, it has been demonstrated that by careful choice of the start and end point it is possible to loop the bitstream re-ordered frames.

Unfortunately, the sequence of I, P and B frames shown in the earlier example is not a typical GOP. This example is known as a "Closed GOP" as it can be decoded without knowledge of pictures sent in previous GOPs. In general this is not the case. Such a closed GOP is easily spotted as the first picture of the GOP is an I picture, and the second picture is a P picture. In addition, a flag carried in the bitstream may also indicate the presence of a closed GOP.

Closed GOPs are generated by software encoders at the start of a sequence. For hardware encoders that are running all the time, there is no real concept of the start of a sequence and so closed GOPs may never be encoded.

FIG. 8 shows the picture re-ordering mechanism for a normal GOP. The shading indicates the pictures comprising the GOP, in input/output and bitstream order.

From FIG. 8 it can clearly be seen that although pictures $B_{-2}$ and $B_{-1}$ form part of the highlighted GOP, they are typically predicted from $P_9$ in the previous GOP and $I_0$ in the current GOP. The highlighted GOP cannot, therefore, usually be decoded in isolation.

However, if $B_{-2}$ and $B_{-1}$ are encoded such that they only use backward prediction modes based on $I_0$, the GOP may now be decoded with no knowledge of what came before. In these special circumstances, the GOP of FIG. 8 can also be counted as a closed GOP and should be indicated as such in the bitstream. It is envisaged in aspects of the present invention that pictures $B_{-2}$ and $B_{-1}$ will be examined to determine whether or not they use only backward prediction modes.

Although looping a sequence starting with a non-closed GOP will still result in a legal bitstream with no syntax errors, computer simulations have demonstrated that the visual impact is unacceptable. B frames at the start of the sequence are incorrectly predicted from an I or a P frame at the end of the sequence rather than one prior to it. It would be possible however, to edit a conventional GOP to convert it in to a closed GOP to allow "seamless" looping of any MPEG2 bitstream. Thus, taking the above example, if it were determined that pictures $B_{-2}$ and $B_{-1}$ employed forward prediction modes, such that the GOP could not be treated as a closed GOP, editing to remove pictures $B_{-2}$ and $B_{-1}$ would convert the GOP to a closed GOP.

Summary of Rules for Re-Ordering

1. The first picture of a looped sequence in bitstream order should be an I picture.
2. The last picture of a looped sequence in bitstream order should be a B picture before an I or a P picture.
3. To avoid incorrect predictions in the first B pictures of the looped sequence, the sequence should start with a closed GOP.

Attention will now be paid to the sequence and Group of Pictures (GOP) headers.

In order for a decoder to decode a looped bitstream it needs to know the display frame rate and the picture dimensions. This information is carried in the MPEG Sequence Header and, in the case of MPEG2, additionally in its Extension. A looped sequence must therefore start with a Sequence Header (and Extension) on replay, although this could be extracted from any part of the bitstream when captured and simply spliced on to the front of the data to be looped.

If the looped sequence starts with a sequence header and extension, the MPEG2 syntax specifies that this should be followed by a Group of Pictures (GOP) header. Therefore, the first picture in the bitstream should not only be an I picture, but the first I picture of a GOP. In addition, starting the looped sequence with a GOP header ensures that the temporal reference carried in MPEG picture headers remains consistent.

Summary of Rules for Sequence & GOP Headers

1. A looped sequence should start with a sequence header, although this may have been extracted from an earlier part of the bitstream, not necessarily that part selected for looping.
2. The first picture of the looped bitstream should be the I picture at the start of a GOP and be preceded by a GOP header.

The decoder buffer occupancy is thought to cause the greatest problems when looping a compressed sequence. When a sequence is encoded specifically for looping, special care can be taken to make looping possible. The encoder simply needs to ensure that the decoder buffer occupancy at the end of the sequence is identical to the buffer occupancy at the start of the sequence. However, more generally, the start and end points will not be known at the time of encoding and it is for this reason that many have said that looping compressed sequences in general is simply not possible.

The present invention solves the buffer occupancy problem for any bitstream segment. The invention is most easily understood using a graphical representation of the operation of coder and decoder buffers.

Referring now to the drawings, the graph of FIG. 1 represents the coder and decoder buffers. The y-axis plots the buffer address and the x-axis represents time. For the sake of simplicity it is assumed that the store is infinite and that the address always increments. In practice a "circular store" will be used and the address will periodically reset to zero.

So, for the case of constant bit-rate operation, the coder buffer read pointer can be represented by a diagonal line passing through the origin. The gradient of the line indicates the bits per second read out of the buffer i.e. the bit-rate. The higher the bit-rate the steeper the gradient.

In a similar way it is possible to represent the decoder buffer read pointer. Since there is assumed to be no delay between reading data from the coder buffer and writing it in to the decoder buffer, and the bit-rates are of course the same, the decoder write address pointer can be presented by the same line as the coder read address pointer. As a consequence, data written into one address in the coder buffer will be transferred to the same address in the decoder buffer.

In addition, the coder buffer write address has been added to the diagram. This curve has a variable gradient dependent on the output bit-rate of the coder VLC (Variable Length Encoder). For the decoder and coder to remain synchronised, the delay though the coder and decoder buffers, T, must remain constant.

Since the decoder VLD (Variable Length Decoder) performs the inverse function of the encoder VLC, it is possible to draw the decoder read address pointer by taking the curve for the coder write address and shifting it right by an amount equal to the total delay, T.

It is also useful to plot the maximum coder buffer write address and the minimum decoder buffer read addresses. The distance measured on the y-axis between the coder read address and the maximum write address represents the physical buffer size.

It is common practice to make the coder and decoder buffers the same size and to define the overall codec delay to be equal to:

$$T = \frac{\text{Buffer size}}{\text{Bit-rate}}$$

When this is the case, the dashed line in FIG. 1 demonstrates graphically that the decoder buffer occupancy is the complement of the coder buffer occupancy. i.e.:

Buffer size=Coder Buffer Occupancy$_t$+Decoder Buffer Occupancy$_{t+T}$

It also follows that in the case of constant bit-rate, if the rate control technique ensures that the coder buffer does not over- or underflow, neither will the decoder buffer.

Using the same graphical analysis techniques it is possible to investigate the effect of taking a section of the compressed bitstream and repeating it for looping. FIG. 2 shows the selection of a suitable portion of the bitstream in the solid line. The segment was chosen according to rules 1 to 5 given above.

FIG. 3 shows the effect on decoder buffer occupancy of looping the chosen bitstream segment.

It can be seen from FIG. 3 that at Time=τ, the decoder buffer underflows, causing the decoder to crash.

The decoder buffer underflow can be understood in a number of ways, perhaps the clearest explanation is given by returning to FIG. 2.

One simple explanation already given for the decoder buffer crash is that the buffer occupancy at the end of the sequence was not identical to the buffer occupancy at the start of the sequence. However, FIG. 2 illustrates a more "useful" explanation:

The time taken to replay the bitstream segment (AB) and the time taken to decode and display the looped sequence (CD) are different. Unless these times are identical, the bitstream replay and the decoding process are bound to get out of step.

Figure 4:
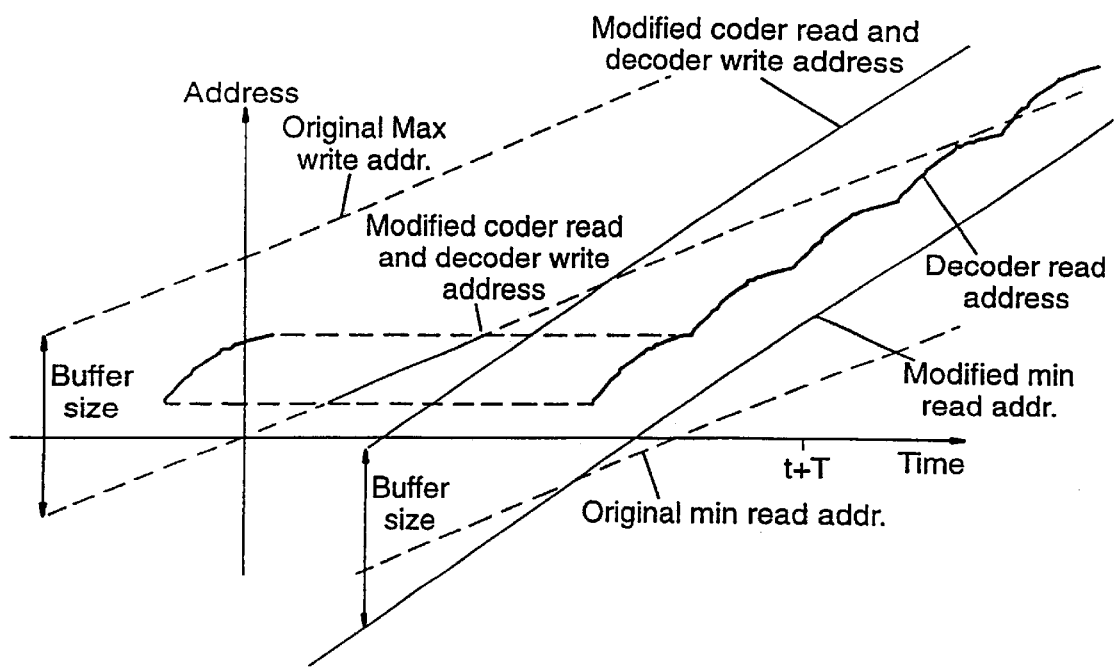
FIG. 4 is a diagram illustrating the replay of a looped bitstream by adjustment of the bit-rate.

Now, it is not possible to change the decode and display time as this is directly related to the number of frames in the looped sequence and the frame rate, which should not be changed. So, the solution is to change the bitstream replay time by adjusting the bit-rate. FIG. 4 shows how, by choosing a suitable bit-rate, the same bitstream segment can be looped indefinitely, avoiding decoder buffer overflow and underflow.

The gradient of the modified coder read and decoder write address line, represents the new replay bit-rate.

The correct replay bit-rate can be calculated as follows:

$$\text{Sequence decode time} = \frac{\text{No. of frames}}{\text{frame rate}}$$

$$\text{Bitstream replay time} = \frac{\text{No. of bits}}{\text{replay bit-rate}}$$

For indefinite looping, $$\text{Sequence decode time} = \text{Bitstream replay time}$$

Thus, $$\text{replay bit-rate} = \frac{\text{No. of bits} \times \text{frame rate}}{\text{No. of frames}}$$

Once the correct replay bit-rate has been determined, in order to maintain MPEG compliance of the looped bitstream, two fields carried within the compressed data stream must be modified to reflect the change in bit-rate. These are:

1. The bit-rate and, in the case of MPEG2, bit-rate_extension
2. The VBV_delay

The bit-rate and bit-rate_extension are quite straightforward as the correct value is simply the bit-rate calculated above converted in to the appropriate units. The VBV_delay is not so easy. Several techniques for calculating new values of VBV_delay can be envisaged. One such technique, is described in the following sub-section.

The VBV_delay is a value carried in the Picture Headers of the MPEG1 & MPEG2 video elementary streams. Its purpose is to synchronise the decoder buffer, in terms of its buffer occupancy, with the coder buffer. The details are well described in Annex C of ISO/IEC 13918-2:1995(E).

Recommendation ITU-T H.262 (1195 E), Information Technology—Generic coding of moving pictures and associated audio information: Video.

For a decoder buffer that is empty at time t=0, we can write:

$$BO_t = \int_0^t r \, dt$$

where $BO_t$ is the decoder Buffer Occupancy at time t and r is the bit-rate.

Now, the VBV_, delay specifies the time that data should remain in the decoder buffer before being decoded. So, using the above equation we can derive buffer occupancy at the time of decoding, thus:

$$BO_{decode} = \int_0^{VBV\_delay} r \, dt$$

Or in the case of constant bit-rate encoding:

$$BO_{decode} = r \times VBV\_\text{delay} \quad (1)$$

Where r is now the constant bit-rate.

The reason for adjusting the replay bit-rate was to prevent decoder buffer over- or underflow. So, starting the looped sequence with the same buffer occupancy as at the same point in the original un-looped bitstream stands a good chance of achieving this. (There is a remote possibility that some very short extraordinary sequences may cause VBV_buffer violations using this technique. Editing of a GOP to create a closed GOP may also lead to a VBV_buffer violation if the average bit rate over the deleted pictures differs widely from the average bit rate over the sequence to be looped. However, these can be identified by off-line analysis of the bitstream, and a suitable offset made to the initial VBV_delay.)

So, for the first frame of a segment we can write:

$$BO_{old} = BO_{new}$$

From equation (1) we can say:

$$r_{old} \times VBV\_delay_{old} = r_{new} \times VBV\_delay_{new}$$

$$\Rightarrow VBV\_delay_{new} = VBV\_delay_{old} \times \frac{r_{old}}{r_{new}}$$

For subsequent frames the same calculation can be applied but an allowance must be made for the divergence in buffer occupancies caused by the different bit-rates. In the case of conventional frame picture coding it can be shown that:

$$VBV\_delay_{new} = VBV\_delay_{old} \times \frac{r_{old}}{r_{new}} + \left[\left(1 - \frac{r_{old}}{r_{new}}\right) \times \frac{nframe \times 90000}{frame\_rate}\right]$$

Where nframe is the number of the frame in the looped sequence starting at zero, and frame_rate is measured in frames per second.

The constant of 90000 is required as VBV_delay is measured in units of 90 kHz ticks.

Similar equations can be derived for Field picture coding and 3:2 pull-down sequences where the decode picture rate is not constant.

A method has been demonstrated that, provided a set of basic rules are followed, makes it possible to take a segment of a compressed video bitstream and replay it forming a looped sequence. Care must first be taken when selecting the frames comprising the looping segment, and then an adjustment made to the replay bit-rate to prevent decoder buffer over- or underflow.

The examples have been taken of MPEG1 (see: ISO/IEC 11172-2 1993, *Information technology—Coding of moving pictures and associated audio for digital storage media at up to about 1,5 Mbit/s—Part 2: Video*) and MPEG2. (See: ISO/IEC 13918-2: 1995(E). Recommendation ITU-T H.262 (1195 E), *Information Technology—Generic coding of moving pictures and associated audio information: Video*) Video elementary bitstreams.

These techniques, in conjunction with some additional steps needed to maintain compliance with ISO/IEC 13918-1: 1995(E). (Recommendation ITU-T H.222.0 (1195E), *Information Technology—Generic coding of moving pictures and associated audio information: Systems*) also make it possible to loop MPEG2 Transport Streams carrying video elementary streams.

With appropriate modifications, the invention will also find application with other video compression schemes.

An important application of the techniques described herein lies in the field of test and measurement. Artificially created bitstreams are already created for the purpose of testing—for example—MPEG2 decoders. It is important, however, and will-be increasingly important to be able to play sequences of "real" compressed video for measurement and fault finding. It will be particularly useful to be able to capture a sequence of bitstream found to pose problems for a decoder and to replay that sequence for further investigation. The looping capability provided by the present invention will considerably assist such endeavours.

Figure 9:
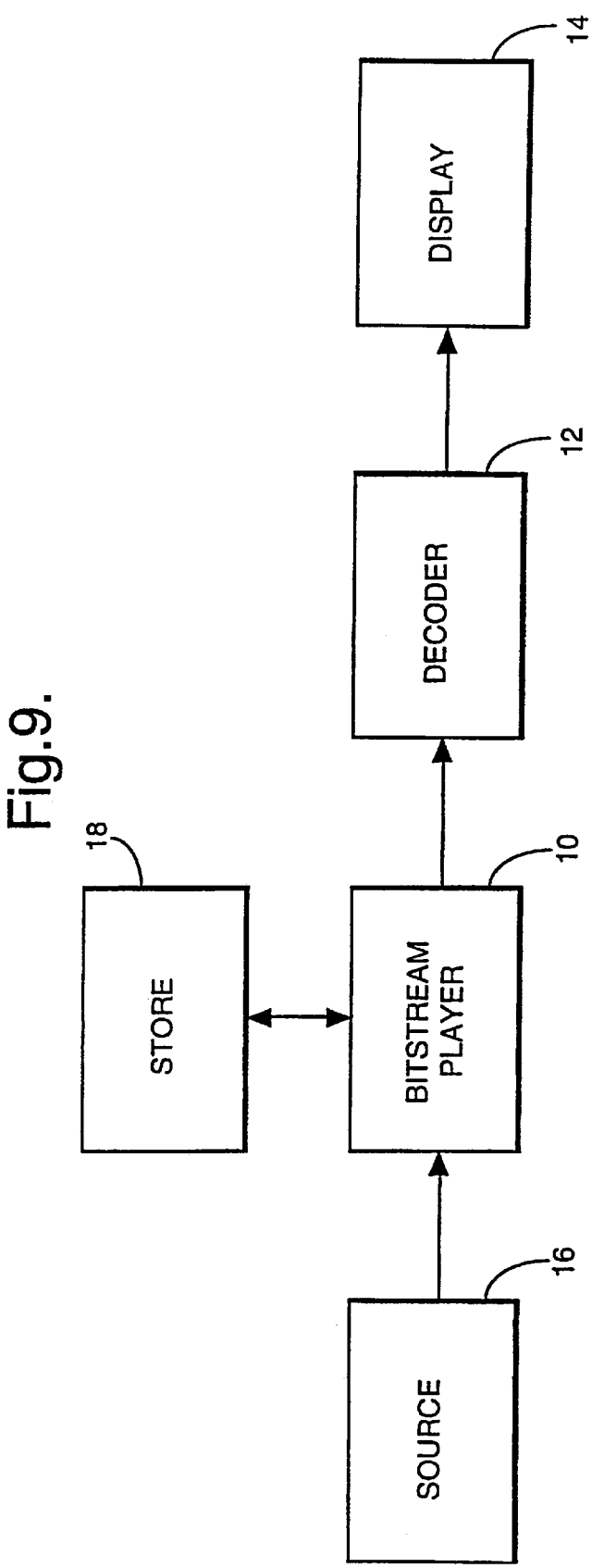
FIG. 9 is a block diagram of apparatus employing the present invention.

There is shown byway of illustration in FIG. 9 a bitstream player 10 having a looping capability according to the present invention. Looped sequences are played out for investigation of a decoder 12 which may have associated with it a display 14. The player is arranged to capture sequences for looping from a source 16 which could be a satellite or terrestrial broadcast. The player may access internal storage or an external store 18.

What is claimed is:

1. A method of playing a sequence of compressed video bitstream having chosen start and end points, the sequence having a decode time determined by the number of frames in the sequence and the video frame rate, wherein the bit rate at which the sequence is played is modified such that the time taken to play the sequence is made equal to the decode time for the sequence.

2. A method according to claim 1, wherein the play bit rate is given by $$\text{replay bit-rate} = \frac{\text{No. of bits} \times \text{frame rate}}{\text{No. of frames}}.$$

3. A method according to claim 1, wherein the compressed video bitstream comprises intra-coded I pictures, forward prediction coded P pictures and both forward and rearward prediction coded B pictures.

4. A method according to claim 1, in which the sequence commences with an I picture, $I_0$.

5. A method according to claim 4, wherein B pictures appearing in the bitstream after $I_0$ but standing before $I_0$ in input picture order are tested to determine whether they employ forward prediction coding and are included in the sequence if they do not employ forward prediction coding and are removed by editing if they do employ forward prediction coding.

6. A compressed video bitstream player, comprising a bitstream input for receiving a compressed video bitstream sequence having a decoder time determined by the number of frames in the sequence and means for playing the sequence continuously with a modified play bit-rate such that the time taken to play the sequence is made equal to the time taken to decode the sequence.

7. A player according to claim 6, wherein the replay bit rate is given by $$\text{replay bit-rate} = \frac{\text{No. of bits} \times \text{frame rate}}{\text{No. of frames}}.$$

* * * * *